United States Patent [19]

Nutter

[11] 4,130,880
[45] Dec. 19, 1978

[54] DATA STORAGE SYSTEM FOR ADDRESSING DATA STORED IN ADJACENT WORD LOCATIONS

[75] Inventor: Geoffrey Nutter, Cheadle, England

[73] Assignee: Ferranti Limited, Hollinwood, England

[21] Appl. No.: 751,953

[22] Filed: Dec. 17, 1976

[30] Foreign Application Priority Data

Dec. 23, 1975 [GB] United Kingdom ............. 52679/75

[51] Int. Cl.² .......................... G06F 13/00; G06F 7/22
[52] U.S. Cl. ................................................. 364/900
[58] Field of Search ............................. 364/900, 200

[56] References Cited

U.S. PATENT DOCUMENTS

| 3,270,325 | 8/1966 | Carter et al. | 364/200 |
|---|---|---|---|
| 3,287,703 | 11/1966 | Slotnick | 364/200 |
| 3,374,463 | 3/1968 | Muir | 364/900 |
| 3,430,202 | 2/1969 | Downing | 364/200 |
| 3,436,737 | 4/1969 | Iverson | 364/900 |
| 3,440,615 | 4/1969 | Carter | 364/200 |
| 3,571,803 | 3/1971 | Huttenhoff | 364/900 |
| 3,916,388 | 10/1975 | Shimp | 364/200 |
| 3,934,132 | 1/1976 | Desmonds | 364/900 |
| 3,938,102 | 2/1976 | Morrin | 364/900 |
| 3,995,253 | 11/1976 | Morrin | 364/900 |
| 3,996,566 | 12/1976 | Moran | 364/200 |
| 4,023,023 | 5/1977 | Bourrez | 364/200 |

Primary Examiner—James D. Thomas
Attorney, Agent, or Firm—Cameron, Kerkam, Sutton, Stowell & Stowell

[57] ABSTRACT

An information retrieval system is described comprising a store having a plurality of word locations, each of M bits for receiving and storing an item of digital data, e.g. an operand of N bits greater than M, a store address circuit for addressing simultaneously selective consecutive bits of an operand in two or more adjacent word locations, and a shift circuit for rearranging the bits read from the store into a desired sequence. A ROM is provided for storing a plurality of multiple-bit words, each defining a different end around shift, and the store addressing circuit includes a multiplexing circuit responsive to the aforementioned multiple-bit words to determine the addresses of each bit of two consecutive word locations within the store. In addition, there is included a store enabling circuit for determining selectively which of the bits addressed is to be read out; the store enabling circuit is responsive to the multiple-bit words derived from the ROM for enabling selected bits to be read out from the store.

10 Claims, 6 Drawing Figures

FIG. 2a.

| SN\BN | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 |
| 1 | 0 | 1 | 1 | 1 | 1 | 1 | 1 | 1 | 1 | 1 | 1 | 1 | 1 | 1 | 1 | 1 |
| 2 | 0 | 0 | 1 | 1 | 1 | 1 | 1 | 1 | 1 | 1 | 1 | 1 | 1 | 1 | 1 | 1 |
| 3 | 0 | 0 | 0 | 1 | 1 | 1 | 1 | 1 | 1 | 1 | 1 | 1 | 1 | 1 | 1 | 1 |
| 4 | 0 | 0 | 0 | 0 | 1 | 1 | 1 | 1 | 1 | 1 | 1 | 1 | 1 | 1 | 1 | 1 |
| 5 | 0 | 0 | 0 | 0 | 0 | 1 | 1 | 1 | 1 | 1 | 1 | 1 | 1 | 1 | 1 | 1 |
| 6 | 0 | 0 | 0 | 0 | 0 | 0 | 1 | 1 | 1 | 1 | 1 | 1 | 1 | 1 | 1 | 1 |
| 7 | 0 | 0 | 0 | 0 | 0 | 0 | 0 | 1 | 1 | 1 | 1 | 1 | 1 | 1 | 1 | 1 |
| 8 | 0 | 0 | 0 | 0 | 0 | 0 | 0 | 0 | 1 | 1 | 1 | 1 | 1 | 1 | 1 | 1 |
| 9 | 0 | 0 | 0 | 0 | 0 | 0 | 0 | 0 | 0 | 1 | 1 | 1 | 1 | 1 | 1 | 1 |
| 10 | 0 | 0 | 0 | 0 | 0 | 0 | 0 | 0 | 0 | 0 | 1 | 1 | 1 | 1 | 1 | 1 |
| 11 | 0 | 0 | 0 | 0 | 0 | 0 | 0 | 0 | 0 | 0 | 0 | 1 | 1 | 1 | 1 | 1 |
| 12 | 0 | 0 | 0 | 0 | 0 | 0 | 0 | 0 | 0 | 0 | 0 | 0 | 1 | 1 | 1 | 1 |
| 13 | 0 | 0 | 0 | 0 | 0 | 0 | 0 | 0 | 0 | 0 | 0 | 0 | 0 | 1 | 1 | 1 |
| 14 | 0 | 0 | 0 | 0 | 0 | 0 | 0 | 0 | 0 | 0 | 0 | 0 | 0 | 0 | 1 | 1 |
| 15 | 0 | 0 | 0 | 0 | 0 | 0 | 0 | 0 | 0 | 0 | 0 | 0 | 0 | 0 | 0 | 1 |

FIG. 2b.

| SN\BN | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | 1 | 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 | 1 | 0 |
| 2 | 1 | 1 | 1 | 1 | 1 | 1 | 1 | 1 | 1 | 1 | 1 | 1 | 1 | 1 | 0 | 0 |
| 3 | 1 | 1 | 1 | 1 | 1 | 1 | 1 | 1 | 1 | 1 | 1 | 1 | 1 | 0 | 0 | 0 |
| 4 | 1 | 1 | 1 | 1 | 1 | 1 | 1 | 1 | 1 | 1 | 1 | 1 | 0 | 0 | 0 | 0 |
| 5 | 1 | 1 | 1 | 1 | 1 | 1 | 1 | 1 | 1 | 1 | 1 | 0 | 0 | 0 | 0 | 0 |
| 6 | 1 | 1 | 1 | 1 | 1 | 1 | 1 | 1 | 1 | 1 | 0 | 0 | 0 | 0 | 0 | 0 |
| 7 | 1 | 1 | 1 | 1 | 1 | 1 | 1 | 1 | 1 | 0 | 0 | 0 | 0 | 0 | 0 | 0 |
| 8 | 1 | 1 | 1 | 1 | 1 | 1 | 1 | 1 | 0 | 0 | 0 | 0 | 0 | 0 | 0 | 0 |
| 9 | 1 | 1 | 1 | 1 | 1 | 1 | 1 | 0 | 0 | 0 | 0 | 0 | 0 | 0 | 0 | 0 |
| 10 | 1 | 1 | 1 | 1 | 1 | 1 | 0 | 0 | 0 | 0 | 0 | 0 | 0 | 0 | 0 | 0 |
| 11 | 1 | 1 | 1 | 1 | 1 | 0 | 0 | 0 | 0 | 0 | 0 | 0 | 0 | 0 | 0 | 0 |
| 12 | 1 | 1 | 1 | 1 | 0 | 0 | 0 | 0 | 0 | 0 | 0 | 0 | 0 | 0 | 0 | 0 |
| 13 | 1 | 1 | 1 | 0 | 0 | 0 | 0 | 0 | 0 | 0 | 0 | 0 | 0 | 0 | 0 | 0 |
| 14 | 1 | 1 | 0 | 0 | 0 | 0 | 0 | 0 | 0 | 0 | 0 | 0 | 0 | 0 | 0 | 0 |
| 15 | 1 | 0 | 0 | 0 | 0 | 0 | 0 | 0 | 0 | 0 | 0 | 0 | 0 | 0 | 0 | 0 |

FIG. 3.

| IOP | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
|  | 31 | 30 | 29 | 28 | 27 | 26 | 25 | 24 | 23 | 22 | 21 | 20 | 19 | 18 | 17 | 16 |

| ROM | 1 | 1 | 1 | 1 | 1 | 1 | 1 | 1 | 0 | 0 | 0 | 0 | 0 | 0 | 0 | 0 |
|---|---|---|---|---|---|---|---|---|---|---|---|---|---|---|---|---|

| ADD | ← | | | N | | | | → | ← | | | N+1 | | | | → |
|---|---|---|---|---|---|---|---|---|---|---|---|---|---|---|---|---|
| ENA | 1 | 1 | 1 | 1 | 1 | 1 | 1 | 1 | 1 | 1 | 1 | 1 | 1 | 1 | 1 | 1 |
| SOP | 15 | 14 | 13 | 12 | 11 | 10 | 9 | 8 | 23 | 22 | 21 | 20 | 19 | 18 | 17 | 16 |

| R4 | 23 | 22 | 21 | 20 | 19 | 18 | 17 | 16 | 15 | 14 | 13 | 12 | 11 | 10 | 9 | 8 |
|---|---|---|---|---|---|---|---|---|---|---|---|---|---|---|---|---|

FIG. 4.

| IOP | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
|  | 31 | 30 | 29 | 28 | 27 | 26 | 25 | 24 | 23 | 22 | 21 | 20 | 19 | 18 | 17 | 16 |

| ROM | 0 | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|---|

BT1:

| ADD | ← | | | N | | | | → | ← | | | N | | | | → |
|---|---|---|---|---|---|---|---|---|---|---|---|---|---|---|---|---|
| ENA | 0 | 0 | 0 | 0 | 0 | 0 | 0 | 0 | 1 | 1 | 1 | 1 | 1 | 1 | 1 | 1 |
| SOP | Z | Z | Z | Z | Z | Z | Z | Z | 7 | 6 | 5 | 4 | 3 | 2 | 1 | 0 |
| R4 | 7 | 6 | 5 | 4 | 3 | 2 | 1 | 0 | Z | Z | Z | Z | Z | Z | Z | Z |

BT2:

| ADD | ← | | | N | | | | → | ← | | | N+1 | | | | → |
|---|---|---|---|---|---|---|---|---|---|---|---|---|---|---|---|---|
| ENA | 1 | 1 | 1 | 1 | 1 | 1 | 1 | 1 | 1 | 1 | 1 | 1 | 1 | 1 | 1 | 1 |
| SOP | 15 | 14 | 13 | 12 | 11 | 10 | 9 | 8 | 23 | 22 | 21 | 20 | 19 | 18 | 17 | 16 |
| R4 | 23 | 22 | 21 | 20 | 19 | 18 | 17 | 16 | 15 | 14 | 13 | 12 | 11 | 10 | 9 | 8 |

| FOP | 7 | 6 | 5 | 4 | 3 | 2 | 1 | 0 | Z | Z | Z | Z | Z | Z | Z | Z |
|---|---|---|---|---|---|---|---|---|---|---|---|---|---|---|---|---|
|  | 23 | 22 | 21 | 20 | 19 | 18 | 17 | 16 | 15 | 14 | 13 | 12 | 11 | 10 | 9 | 8 |

FIG. 5.

| | | | | | | | | | | | | | | | | | |
|---|---|---|---|---|---|---|---|---|---|---|---|---|---|---|---|---|---|
| IOP | | 15 | 14 | 13 | 12 | 11 | 10 | 9 | 8 | 7 | 6 | 5 | 4 | 3 | 2 | 1 | 0 |
| | | 31 | 30 | 29 | 28 | 27 | 26 | 25 | 24 | 23 | 22 | 21 | 20 | 19 | 18 | 17 | 16 |
| ROM | | 1 | 1 | 1 | 1 | 1 | 1 | 1 | 1 | 1 | 0 | 0 | 0 | 0 | 0 | 0 | 0 |

BT1:
| | | | | | | | | | | | | | | | | | |
|---|---|---|---|---|---|---|---|---|---|---|---|---|---|---|---|---|---|
| ADD | | ←――――――― N ―――――――→ | | | | | | | | ←――――― N+1 ―――――→ | | | | | | | |
| ENA | | 1 | 1 | 1 | 1 | 1 | 1 | 1 | 1 | 1 | 1 | 1 | 1 | 1 | 1 | 1 | 1 |
| SOP | | 15 | 14 | 13 | 12 | 11 | 10 | 9 | 8 | 7 | 22 | 21 | 20 | 19 | 18 | 17 | 16 |
| R4 | | 22 | 21 | 20 | 19 | 18 | 17 | 16 | 15 | 14 | 13 | 12 | 11 | 10 | 9 | 8 | 7 |

BT2:
| | | | | | | | | | | | | | | | | | |
|---|---|---|---|---|---|---|---|---|---|---|---|---|---|---|---|---|---|
| ADD | | ←――――――― N+1 ―――――――→ | | | | | | | | ←――――― N+2 ―――――→ | | | | | | | |
| ENA | | 1 | 1 | 1 | 1 | 1 | 1 | 1 | 1 | 1 | 0 | 0 | 0 | 0 | 0 | 0 | 0 |
| SOP | | 31 | 30 | 29 | 28 | 27 | 26 | 25 | 24 | 23 | 0 | 0 | 0 | 0 | 0 | 0 | 0 |
| R4 | | S | S | S | S | S | S | S | 31 | 30 | 29 | 28 | 27 | 26 | 25 | 24 | 23 |

| | | | | | | | | | | | | | | | | | |
|---|---|---|---|---|---|---|---|---|---|---|---|---|---|---|---|---|---|
| FOP | | 22 | 21 | 20 | 19 | 18 | 17 | 16 | 15 | 14 | 13 | 12 | 11 | 10 | 9 | 8 | 7 |
| | | S | S | S | S | S | S | S | 31 | 30 | 29 | 28 | 27 | 26 | 25 | 24 | 23 |

DATA STORAGE SYSTEM FOR ADDRESSING DATA STORED IN ADJACENT WORD LOCATIONS

This invention relates to data processing apparatus, and is particularly concerned with the retrieval from the store of digital information, which does not conform with store boundaries.

Digital information items, are frequently stored in the form of operands which causes them to occupy more than one word of storage. It may in this situation be necessary to read out from the store part only of the operand and this may involve reading out part of one word and part of the next. In order to put the information read out in usable form, the parts of the two words must be arranged in the correct order.

Alternatively, if one is using a skewed store such as that described in our copending application Ser. No. 742,230, then the information may already be displaced with respect to the storage bits, and shifting is necessary to arrange any read-out information in the correct order. In addition, shifting of an operand to the right or left may be required to increase or decrease its numerical value.

According to the present invention there is provided data processing apparatus which includes storage means for storing a multiple-word operand, store addressing means arranged to address consecutive bits in two words of the operand simultaneously, store enabling means arranged to control the read-out of the bits so addressed by the store addressing means, and shift means operable to arrange the bits read out from the store in the desired sequence.

Two types of shift may be involved. The simple left or right shift of a number in a register involves losing the bits which are shifted out of the register, at the same time putting zeros or sign bits in the empty positions at the other end. On the other hand, the end-around shift involves recirculating bits shifted out of one end of the register into the other end of the register. Both techniques are, in themselves, well-known for manipulating stored information.

An embodiment of the invention will now be described with reference to the accompanying drawings, in which:

FIGS. 2a and 2b show the mask patterns obtained from the read-only memory of FIG. 1; and FIGS. 3 to 5 illustrate the operation of the circuit of FIG. 1.

Figure 1:
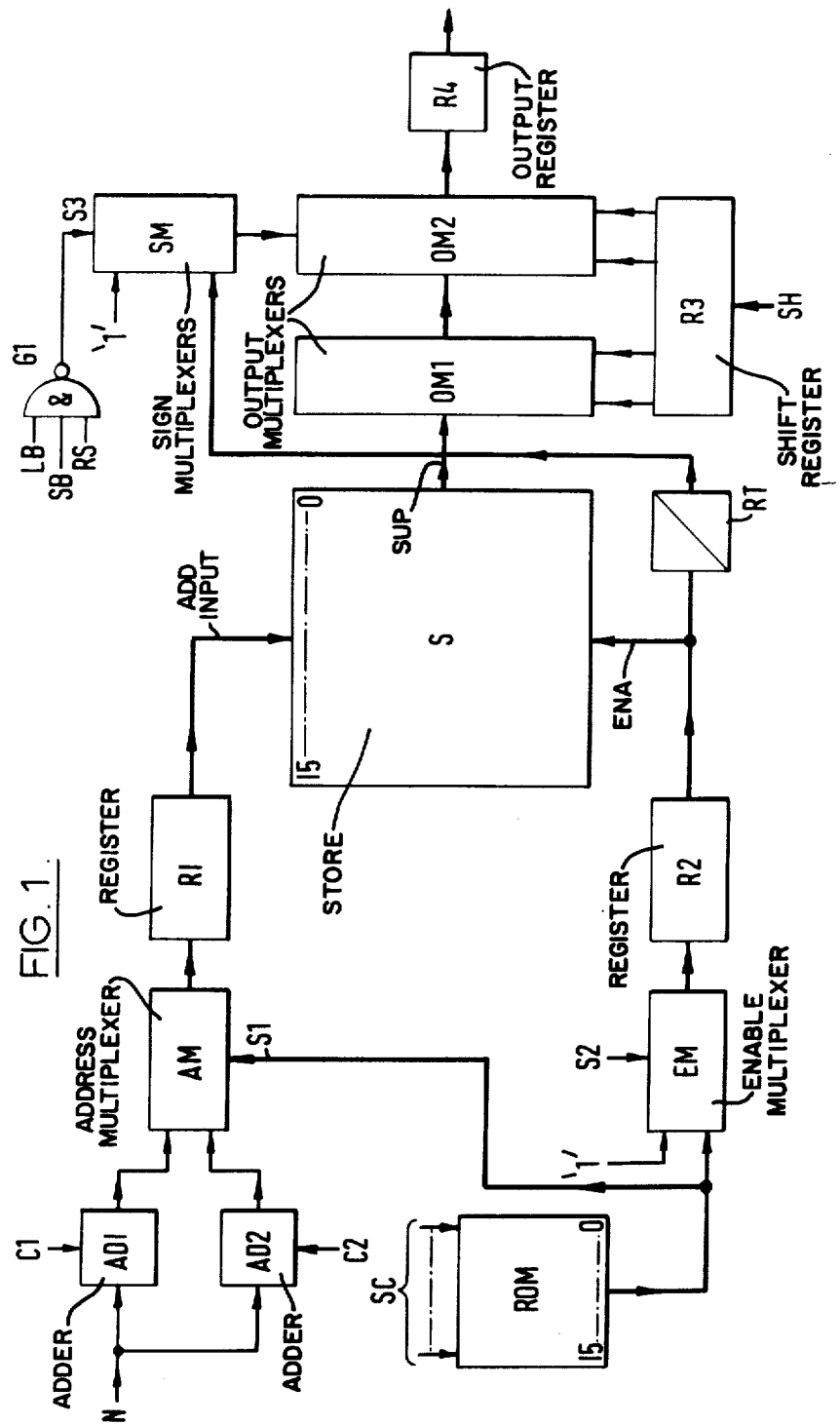
FIG. 1 shows a schematic block diagram of a circuit arranged in accordance with the invention.

The storage capacity of a store S in FIG. 1 is illustratively 16 bits wide and may be of any length (say 1000 words). The operands stored in the store S may be any multiple number of words in length. The examples to be considered later relate to 32-bit (i.e. 2-word) operands. In the circuit arrangement to be described the negative logic convention is used. The numbers used to refer to the store contents indicate the bit number, and not any value of the binary information stored at that address. In FIG. 1 the thick lines denote 16-bit parallel data highways, whilst the thin lines indicate signal paths or serial highways.

The function of the circuit arrangement of FIG. 1 is to provide left or right shifts of the operand to any extent required.

Referring now to FIG. 1, the main feature of the circuit is the store S which is, as already stated, 16-bits wide. The length of the store S is not important, but may, for example, be 1000 words. Two inputs to the store S are shown. The upper input ADD carries the less significant address bits for all 16-bits, provided by a separate 2-way address multiplexer AM and register R1 for each bit. Though only one address multiplexer AM and register R1 is shown, it is understood that there would be a total of sixteen such multiplexers and registers, with each register R1 coupled to the store S. The address multiplexers AM each have two inputs, connected to the outputs of adders AD1 and D2. Each adder has the word address input N applied to it. Adder AD1 has a control input C1 which is arranged to be a '1' whenever a left shift is required, except for the first beat of such a shift, and is '0' at all other times. The other adder AD2 has a control input C2 which is arranged to be '1' whenever a right shift is required, and a '0' at all other times. The presence of a '1' at the control input of either adder causes the word address applied to it to be increased by 1.

Each of the 16 address multiplexers AM has a selector input S1 applied to it bearing a 16-bit mask pattern from a read-only memory ROM. The actual mask patterns obtained will be described later. The shift control inputs SC to the read-only memory determine its output pattern.

The other input ENA to the store S is a 16-bit "enable" input determining which bits may be read out. The 16-bit pattern applied to this input is determined by 16 2-way enable multiplexers EM (only one being shown for sake of clarity), each having an associated register R2. One input of each multiplexer EM is the output pattern of the read-only memory ROM, whilst the other input is a permanent '1'.

The selector input S2 of each multiplexer EM is arranged to be '1' for the first beat only, if right shift is required, and for the last beat only if left shift is required. For all other beats this input is '0', except that for a single-beat operation this input is '1'.

The outputs from store S are applied to 16 pairs of 4-way output multiplexers, only two of which are shown in FIG. 1. The first multiplexer OM1 of each pair has inputs enabling it to produce shifts of 0, 1, 2 or 3 bits whilst the second 4-way multiplexer OM2 of the pair is able to produce shifts of 0, 4, 8 or 12 bits.

These pairs of multiplexers OM are controlled by a shift register R3, to which shift codes SH are applied.

The outputs from the multiplexers OM2 are passed through an output register R4.

An additional feature shown in FIG. 1 is necessary to extend the sign bit (i.e. the last bit) of a number when right shift is applied. A strobe input ST to each second 4-way multiplexer OM2 is derived from a series of 16 2-way sign multiplexers SM, only one of which is shown in FIG. 1. One input to each multiplexer SM is a permanent '1', whilst the other is derived from the mask pattern from the read-only memory ROM. The change that is effected is a rotation of the pattern, in that bit zero of the ROM pattern is connected to the bit 15 sign multiplexer SM, bit 15 of the ROM pattern is connected to the bit O multiplexer, and so on in between.

This rotation is represented by the block RT, though in practice achieved by wiring connections. The selector inputs S3 for the multiplexers SM are derived from a single NAND gate G1 having three inputs. A first input RS indicates the presence of right shift, a second input indicates the last beat of a cycle, and a third input SB is the sign bit or, bit 15, of the operand read out from the store S.

Before considering the operation of the circuit in detail, it is necessary to consider the mask patterns obtained from the read only memory ROM.

FIG. 2a shows the arrangement of patterns which are applied to the multiplexers AM and EM for left shift, and FIG. 2b shows the right shift patterns. The mask pattern is a 16-bit pattern of 'zeros' and/or 'ones', and varies for each bit shift from zero to 15 bits. The tables in FIGS. 2a and b show the pattern for each shift number. The effect of these patterns on the multiplexers and store must be considered. In the case of the address multiplexers AM, a selector input S1 of '1' means that the upper input shown is applied to the output whereas a '0' on the selector input S1 means that the lower input is applied to the output. In the case of the store, a '1' on the 'enable' input ENA of any bit allows that bit to be read out, whilst a '0' prevents read out.

Considering first the problem of reading out from the store S only bits 8 to 23 of a 32-bit operand, the operation of the circuit of FIG. 1 will now be described. The location of the operand in the store S is not important; the first word is considered to have an address N and the second word an address N+1. The read-only memory ROM will be required to produce the pattern relating to a right shift of number 8. This mask pattern has '0"s for bits 0 to 7 and '1's for bits 8 to 15, as shown in FIG. 2b.

Considering a single beat of the operating cycle, the adder AD2 has a '1' as the control input C2 and the address N as the input. Adder AD1 has an '0' applied to its control input C1. Hence the lower input of each of the address multiplexers AM represents the address N+1 whilst the upper input represents the address N. The output pattern from the read-only memory ROM has already been described. The '0' or selector input S1 to the address multiplexers AM for bits 8 to 15 means that the address N is applied to these bits. Similarly, the '1' selector input to the address multiplexers for bits 0 to 7 means that the address N+1 is applied to these bits. FIG. 3 shows at ROM the pattern from the read-only memory ROM, and the store address inputs ADD, as well as the original operand IOP held in the store.

The enable multiplexers EM have a '1' applied to their selector inputs S2 since a single-beat operation is being performed. Hence, regardless of the pattern from the read-only memory ROM, all store bits will be enabled as shown at ENA in FIG. 3. As a result the store output SOP shown in FIG. 3 is bits 16 to 23 having the address N+1, and bits 8 to 15 having the address N. To obtain the desired output of bits 8 to 23 in the correct order, a right-hand end-around shift of 8 bits is applied by the output multiplexer OM2. FIG. 3 finally shows at R4 this corrected store output as stored in register R4.

The operation described above may be extended to read out any 16 consecutive bits. If, for example, bits 3 to 18 were required, then a three-bit right shift is needed, and the appropriate pattern from the read-only memory ROM is applied to the address multiplexers AM. The output multiplexer QM1 is also arranged to provide the necessary end-around shift.

The above examples involve only right-hand shifts, and are concered with reading out only 16 bits. The approach described may also be used to apply left or right shifts to the entire operance, though this takes more time. Such shifts may be necessary to re-arrange stored information, or to change the value of the stored number. For example, a left-hand shift of one bit increases the value of the number by a power of 2 and a right-hand shift of one bit decreases the value of the number by a power of 2. Shifts of this nature are not end-around shifts; the bits shifted out of the store are lost.

Consider now the case of an eight-bit left shift applied to the whole 32-bit operand. This operation will take two beats of machine time, and is illustrated in FIG. 4.

The address input to the two adders AD1 and AD2 is N for both beats in the case of a left shift. During the first beat each adder has a control input C1 or C2 of '0', and hence both inputs to the address multiplexers AM are N. The mask pattern ROM from the read-only memory ROM thus has no effect, and the address N is applied to the 16 store bits. Referring to FIG. 2a, it will be seen that the mask pattern from the read-only memory ROM is '0' for bits 0 to 7 and '1' for bits 8 to 15. For the first beat BT1 the select input S2 of each enable multiplexer EM is '0', and hence the mask pattern is applied to the enable inputs to the store S. As a result only bits 0 to 7 are read out, bits 8 to 15 all being '0' on account of the absence of the enable input ENA. These are shown at SOP as Z's in FIG. 4 to prevent confusion with the value of bit '0'. The subsequent 8-bit left hand shift applied by the output multiplexer OM2 corrects the order of the store output so that bits 0 to 7 are all zeros (Z) whilst bits 8 to 15 are identical with bits 0 to 7 of the original operand.

On the next beat, BT2, adder AD1 has a '1' applied to its control input C1, resulting in an output of N+1. The mask pattern ROM from the read-only memory, applied to the select input S1 of the address multiplexers AM results in the address N+1 for bits 0 to 7 and the address N for bits 8 to 15. The enable multiplexers EM have a '1' applied to their select inputs S2 and hence the store enable inputs ENA all have a '1' applied, enabling all bits to be read out. The addressing already indicated results in bits 16 to 23 and bits 8 to 15 being read out from the store as shown at SOP. The 8 bit left shift applied by the output multiplexer OM2 restores the original order of bits 8 to 23.

The final 32 bit output FOP resulting from the 8-bit left shift operation is thus eight-zeros followed by bits 0 to 23 inclusive, as required.

In the event of a right-hand shift being required, it is necessary to ensure that the sign bit (bit 31) is preserved. This means that if the number is negative (i.e., bit 31 is '1'), then any gaps at the 'top' end of the resulting operand must all contain a '1'. The case of a seven-bit right-hand shift will now be described with reference to FIG. 5. In the case of a right-hand shift the initial address input increases with each beat.

During the first beat the address input to each adder AD1 and AD2 is N. Adder AD1 has a '0' applied to its control input C1 during both beats, whilst adder AD2 has a '1' applied to its control input C2 during both beats. Hence during the first beat the upper inputs to the address multiplexers AM are N, whilst the lower inputs are N+1. The mask pattern ROM from the read-only memory ROM comprises '0' for bits 0 to 6 and '1' for bits 7 to 23 and this is applied to the select inputs s1 of address multiplexers AM. Hence the store address inputs ADD for this first beat are N+1 for bits 0 to 6 and N for bits 7 to 23. This is shown in FIG. 5. During the first beat, BT1, the select inputs S2 of the enable multiplexers EM are all '1', and hence a '1' is applied to all store enable inputs as shown at ENA. As a result bits 7 to 15 of the first word of the operand are read out together with bits 16 to 22 of the second word as shown at SOP. The necessary 7-bit right shift is applied by the pairs of output multiplexers OM1 and OM2 in combination, resulting in bits 7 to 22 appearing in sequence as shown at R4.

For the second beat, BT2, the input address to the two adders is increased to N+1. The same control inputs exist on each adder, and hence the upper inputs of the address multiplexers AM have the address N+1 applied, whilst the lower inputs have the address N+2 applied.

The mask pattern ROM from the read-only memory ROM is applied to the select inputs S1 of the address multiplexers AM, and hence the address inputs ADD to the store have the address N+1 applied to bits 7 to 15 of the second word and the address N+2 applied to bits 0 to 6. The enable multiplexers EM have '0' applied to the select inputs S2, and thus the mask pattern from the read-only memory ROM is applied to the enable inputs ENA of the store. Hence only bits 7 to 15 or the second word are read out, as shown at SOP, the other bits (0 to 6) being, at this stage, replaced by zeros. As before, the order of these bits is corrected by the output multiplexers OM1 and OM2 to give the desired output bit sequence shown at R4. Bits 9 to 15 are shown as containing "sign" bits, which will be '0' in the case of a positive operand.

If the original operand was negative, then the sign bit (bit 31) will be '1', and this will have to be inserted in place of each bit shown as S. This is done by gate G1 and 16 sign multiplexers SM. When all three inputs to gate G1 are present this indicates that the conditions existing are those of the last beat of a right shift with a negative operand. The output of the NAND gate G1 is thus '0'. This is applied to the select input S3 of sign multiplexer SM and allows the rotated pattern from the read-only memory ROM to be applied to the strobe inputs ST of the output multiplexers OM2. The strobe inputs for bits 0 to 8 of the second word, are all '1', allowing the output multiplexers to operate normally. However, for bits 9 to 15 the strobe inputs are '1'. These inhibit the '0's which would otherwise appear in place of bits 9 to 15 of the second word, and forces '1's to appear in their place, thus extending the existing sign bit to the end of the word. At all other times at least one input to gate G1 is '0', causing a '1' to be applied to the select inputs S3 of sign multiplexers SM, hence applying '1' to the strobe inputs ST of all the output multiplexers MX2.

The examples of left and right shifts described above may be followed in all cases of shifts of between 1 and 15 bits left or right.

Shifts by more than 16 bits require variations on the above arrangement. In the case, for example, of a 24-bit left shift, the first output word will be all zeros, whilst the second output word is the same as the first word in the case of an 8-bit left shift described above. In the same way, a 23-bit right shift will have the first word the same as the second word in the case of a 7-bit right shift, as already described, whilst the second word will be all sign bits.

Exactly the same procedure is followed in the case of operands more than 2 words (i.e. 32 bits) long, except that more beats will be required to perform the left or right shifts.

In the case of left shifts of operands occupying more than 2 words, the address input N is increased by one for each beat after the second beat. Hence for the third beat the address input is N+1, and so on.

The store S may be of any width, and is not limited to 16 bits. Similarly it may be of any desired length.

The registers R1, R2 and R4 are included to allow the operations described to be continuous over several machine beats, whilst allowing other processing to occur at the same time. This technique is commonly used and is referred to as "pipelining".

What we claim is:

1. An information storage and retrieval system for storing operands comprising N bits, said system comprising:
   (a) storage means having and output and having a plurality of multiple-bit word locations and arranged for storing multiple-bit operands each occupying part of at least of two or more adjacent word locations, each word location having defined boundaries and M bits, M being less than N;
   (b) store addressing means coupled to said storage means for generating the addresses for each of N selected consecutive bits of an operand in two adjacent word locations and for applying these addresses simultaneously across word boundaries to said adjacent word locations;
   (c) store enabling means coupled to said storage means for determining selectively which of the bits so addressed by said store addressing means is read out; and
   (d) shift means coupled to said output of said storage means for shifting the N bits read out from said storage means to assemble the N addressed bits of the operand from the adjacent word locations in a desired sequence.

2. The system as claimed in claim 1 which includes memory means coupled to said store enabling means and to said store address means for storing a plurality of multiple-bit words, each bit of said multiple-bit words both defining the address of a bit within a word location and determining whether a bit addressed is enabled to be read out from said storage means, and store reading means operable to read a selected word from said memory means for application to said store addressing means and said store enabling means.

3. The system as claimed in claim 2 in which said memory means comprises a read-only memory.

4. The system as claimed in claim 2 which includes means for writing sign bits into an operand read out from said storage means.

5. The system as claimed in claim 4 in which said means for writing include a sign multiplexer coupled to said multiplexer and to said memory means, and responsive to a modified output from said memory means to impress sign bits onto the appropriate bits of the output of said output multiplexer.

6. The system as claimed in claim 5 which includes inverter means coupled to said memory means for inverting the output from said memory means and for applying the inverted output to said sign multiplexer.

7. An information storage and retrieval system for storing operands each comprising N bits, said system comprising:
   (a) storage means having a plurality of multiple-bit word locations and arranged for storing multiple-bit operands each occupying parts of at least two or more adjacent word locations, each word location having defined boundaries and M bits, M being less than N;

(b) store addressing means coupled to said storage means for generating the addresses of N selected consecutive bits of an operand in two adjacent word locations and for applying these addresses simultaneously across word boundaries to said adjacent word locations;

(c) store enabling means coupled to said storage means for determining selectively which of the bits so addressed by said storage addressing means is read out;

(d) shift means coupled to said storage means for shifting the N bits read out from said storage means to assemble the N addressed bits of the operand from the adjacent word locations in a desired sequence;

(e) memory means coupled to said store enabling means and to said store address means for storing a plurality of multiple-bit words, each word defining a different end-around shift, and store reading means operable to read a selected word from said memory means for application to said store addressing means and said store enabling means; and (f) said store addressing means includes a multiplexer having a control input coupled to said memory means, for receiving the selected word from said memory means and having further inputs to which are applied the addresses in said storage means for the two consecutive words from which bits are to be read, said multiplexer for applying to said storage means one or other of said addresses in accordance with a particular bit of the said selected word from said memory means.

8. The system as claimed in claim 7 in which said store addressing means includes two or more adders each responsive to the address in said storage means of the first of the two consecutive words from which bits are to be read and to a predetermined control input to deliver to said multiplexer the addresses of the two words from which bits are to be read simultaneously.

9. An information storage and retrieval system for storing operands each comprising N bits, said system comprising:

(a) storage means having a plurality of multiple-bit word locations and arranged for storing multiple-bit operands each occupying parts of at least of two or more adjacent word locations, each word location having defined boundaries and M bits, M being less than N;

(b) store addressing means coupled to said storage means for generating the addresses of N selected consecutive bits of an operand in two adjacent word locations and for applying these addresses simultaneously across word boundaries to said adjacent word locations;

(c) store enabling means coupled to said storage means for determining selectively which of the bits so addressed by said storage addressing means is read out; (d) shift means coupled to said storage means for shifting the N bits read out from said storage means to assemble the N addressed bits of the operand from the adjacent word locations in a desired sequence;

(e) memory means coupled to said store enabling means and to said store enabling means for storing a plurality of multiple-bit words, each word defining a different end-around shift, and store reading means operable to read a selected word from said memory means for application to said store addressing means and said store enabling means; and (f) said store enabling means include a multiplexer coupled to said storage means and responsive to a control signal for applying to said storage means either the selected word from said memory means or a predetermined fixed pattern of digits as determined by the control signal.

10. An information storage and retrieval system for storing operands each comprising N bits, said system comprising:

(a) storage means having a plurality of multiple-bit word locations and arranged for storing multiple-bit operands each occupying parts of at least of two or more adjacent word locations, each word location having defined boundaries and M bits, M being less than N;

(b) store addressing means coupled to said storage means for generating the addresses of N selected consecutive bits of an operand in two adjacent word locations and for applying these addresses simultaneously across word boundaries to said adjacent word locations;

(c) store enabling means coupled to said storage means for determining selectively which of the bits so addressed by said storage addressing means is read out;

(d) shift means coupled to said storage means and including at least one output multiplexer responsive to a shift signal for shifting the N bits read out from said storage means the shift necessary to assemble the N addressed bits of the operand from the adjacent word locations in a desired sequence; and (e) a shift register coupled to said output multiplexer for storing the shift signal for application to said output multiplexer.

* * * * *